United States Patent
Han et al.

(10) Patent No.: US 11,135,955 B2
(45) Date of Patent: Oct. 5, 2021

(54) MESH TYPE SEAT FOR A VEHICLE

(71) Applicants: HYUNDAI MOTOR COMPANY, Seoul (KR); KIA MOTORS CORPORATION, Seoul (KR)

(72) Inventors: Jong Seok Han, Seoul (KR); Gil Ju Kim, Seoul (KR); Seon Chae Na, Yongin-si (KR); Suk Won Hong, Bucheon-si (KR); Chan Ho Jung, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/918,886

(22) Filed: Jul. 1, 2020

(65) Prior Publication Data
US 2021/0122274 A1    Apr. 29, 2021

(30) Foreign Application Priority Data
Oct. 23, 2019 (KR) .................. KR10-2019-0131859

(51) Int. Cl.
*B60N 2/70* (2006.01)
*B60N 2/90* (2018.01)
*B60N 2/72* (2006.01)

(52) U.S. Cl.
CPC .............. *B60N 2/7011* (2013.01); *B60N 2/72* (2013.01); *B60N 2/99* (2018.02)

(58) Field of Classification Search
CPC ........ B60N 2/7011; B60N 2/99; B60N 2/986; B60N 2/72; A47C 7/345; A47C 7/347; A47C 7/34

USPC ....................................................... 297/284.2
See application file for complete search history.

(56) References Cited

U.S. PATENT DOCUMENTS

| | | | |
|---|---|---|---|
| 4,500,136 A * | 2/1985 | Murphy .................. | A47C 7/46 297/284.9 |
| 4,938,529 A * | 7/1990 | Fourrey .................. | B60N 2/99 297/284.9 |
| 6,302,487 B1 | 10/2001 | Fujita | |
| 6,663,177 B2 | 12/2003 | Blanco | |
| 7,618,096 B2 | 11/2009 | Fujita | |
| 9,193,284 B2 * | 11/2015 | Line ..................... | B60N 2/0244 |
| 9,707,870 B2 * | 7/2017 | Line ..................... | B60N 2/0232 |
| 10,286,825 B2 * | 5/2019 | Boland .................. | B60N 2/914 |
| 2002/0036420 A1* | 3/2002 | Footitt ..................... | A47C 7/46 297/284.4 |
| 2003/0127895 A1 | 7/2003 | Stiller | |
| 2006/0279119 A1 | 12/2006 | Fujita | |

(Continued)

FOREIGN PATENT DOCUMENTS

| | | |
|---|---|---|
| JP | 2001087077 A | 4/2001 |
| KR | 20060129948 A | 12/2006 |
| KR | 20130056865 A | 5/2013 |

*Primary Examiner* — Mark R Wendell
(74) *Attorney, Agent, or Firm* — Lempia Summerfield Katz LLC

(57) ABSTRACT

A mesh type seat for a vehicle includes a mesh mounted for supporting the upper body and the lower body of a passenger on a seat frame. An elastic member and a damping member are installed on the mesh type seat and are capable of adjusting the tension of the mesh to the side of the seat frame, thereby providing a comfortable seating feeling to the passenger by adjusting the tension of the mesh while maximizing ventilation performance.

11 Claims, 5 Drawing Sheets

(56) References Cited

U.S. PATENT DOCUMENTS

2013/0020852 A1 1/2013 Corcoran
2019/0313802 A1* 10/2019 Zhou ..................... A47C 7/465

* cited by examiner

MESH TYPE SEAT FOR A VEHICLE

CROSS-REFERENCE TO RELATED APPLICATION

This application claims under 35 U.S.C. § 119(a) the benefit of priority to Korean Patent Application No. 10-2019-0131859 filed on Oct. 23, 2019, the entire contents of which are incorporated herein by reference.

BACKGROUND

(a) Technical Field

The present disclosure relates to a mesh type seat for a vehicle, and more particularly, to a mesh type seat for a vehicle, which may provide a comfortable seating feeling by adjusting the tension of a mesh while maximizing ventilation performance.

(b) Background Art

As is well known, a vehicle seat is classified into a seat cushion or bottom on which a passenger may sit, a seatback against which the upper body of the passenger or occupant may lean, a headrest against which a head of the occupant may lean, and the like.

Further, the conventional seat is composed of a number of components, such as a seat frame, a spring mounted to the seat frame to provide an elastic support force, a foam pad having a predetermined thickness surrounding the seat frame and the spring, and a seat cover made of leather, fabric, or the like and surrounding the foam pad.

Furthermore, various convenient devices, such as an electric component for reclining and tilting a seat, a lumber support for supporting the waist and lower back of an occupant, and a ventilation device for discharging air, are often installed in the seat.

As a result, the interior space of the vehicle is limited but the conventional seat is gradually increasing in size, thickness, and the like.

If the conventional seat as described above is applied to an autonomous vehicle, there is a limit to easily provide a swivel trajectory for rotating the seat in a desired direction and a trajectory for implementing a relaxation posture of the seat.

Therefore, as a seat mounted to the autonomous vehicle, there is a demand for a slim-type seat with a minimized size and thickness to easily provide an operation trajectory for the swivel motion and the relaxation posture, a seat that may maximize light-weight and ventilation performance, and the like.

The above information disclosed in this Background section is only to enhance understanding of the background of the disclosure. Accordingly, the Background section may contain information that does not form the prior art that is already known in this country to a person of ordinary skill in the art.

SUMMARY OF THE DISCLOSURE

The present disclosure is intended to solve the above problem. An object of the present disclosure is to provide a mesh type seat for a vehicle, where a mesh is mounted for supporting the upper body and the lower body of a passenger or occupant on a seat frame. An elastic member and a damping member may be installed and may be capable of adjusting the tension of the mesh to the side of the seat frame, thereby providing a comfortable seating feeling by adjusting the tension of the mesh while maximizing the ventilation performance.

For achieving the object, the present disclosure provides a mesh type seat for a vehicle. The mesh type seat includes: a seatback main frame having side end portions; a seatback side frame rotatably mounted to both of the side end portions of the seatback main frame via a first hinge device; a first elastic member connected between the seatback main frame and the seatback side frame to provide an elastic restoring force outward from the seatback side frame; a first damper connected between the seatback side frame and the first hinge device to absorb vibration of the seatback side frame; and a seatback mesh having an upper end portion and a lower end portion fixed to the seatback main frame, and having side end portions, both of which are fixed to the seatback side frame.

In one example, the first hinge device is composed of: a first hinge bracket provided in a structure of having a first hinge pin through hole formed in an outside end portion thereof to be mounted to an upper end portion of the seatback main frame; a second hinge bracket provided in a structure of having a second hinge pin through hole formed in an outside end portion thereof to be mounted to a lower end portion of the seatback main frame; a first hinge pin inserted into and fastened to a first hinge pin fastening hole formed in the upper end portion of the seatback side frame and the first hinge pin through hole of the first hinge bracket; and a second hinge pin inserted into and fastened to a second hinge pin fastening hole formed in the lower end portion of the seatback side frame and the second hinge pin through hole of the second hinge bracket.

In one example, an outside end portion of the first damper is fastened to the seatback side frame while the first damper for absorbing the vibration of the seatback side frame is inserted into an outer diameter portion of the first hinge pin.

In one example, a spring is inserted into an outer diameter portion of the second hinge pin as a first elastic member for providing an elastic restoring force outward from the seatback side frame. One end portion of the spring is connected to the seatback side frame and the other end portion thereof is connected to the second hinge bracket.

In one example, the seatback side frame is composed of a seatback inner side frame and a seatback outer side frame that are fastened to each other while clamping both side end portions of the seatback mesh.

In one example, the seatback main frame is produced in a rectangular frame shape having a large hole penetrated in a center thereof in order to prevent interference with the seatback mesh on which a passenger load acts.

The mesh type seat for the vehicle according to the present disclosure may further include: a seat cushion main frame having side end portions; a seat cushion side frame rotatably mounted to both side end portions of the seat cushion main frame via a second hinge device; a second elastic member connected between the seat cushion main frame and the seat cushion side frame to provide an elastic restoring force outward from the seat cushion side frame; a second damper connected between the seat cushion side frame and the second hinge device to absorb vibration of the seat cushion side frame; and a seat cushion mesh having a front end portion and a rear end portion fixed to the seat cushion main frame, and having side end portions, both of which are fixed to the seat cushion side frame.

In one example, the second hinge device is composed of a third hinge bracket provided in a structure of having a third hinge pin through hole formed in an outside end portion thereof to be mounted to a rear end portion of the seat cushion main frame; a fourth hinge bracket provided in a structure of having a fourth hinge pin through hole formed in an outside end portion thereof to be mounted to a front end portion of the seat cushion main frame; a third hinge pin inserted into and fastened to a third hinge pin fastening hole formed in the rear end portion of the seat cushion side frame and the third hinge pin through hole of the third hinge bracket; and a fourth hinge pin inserted into and fastened to a fourth hinge pin fastening hole formed in the front end portion of the seat cushion side frame and the fourth hinge pin through hole of the fourth hinge bracket.

In one example, an outside end portion of the second damper is fastened to the seat cushion side frame while the second damper for absorbing the vibration of the seat cushion side frame is inserted into an outer diameter portion of the third hinge pin.

In one example, a spring is inserted into an outer diameter portion of the fourth hinge pin as a second elastic member for providing an elastic restoring force outward from the seat cushion side frame. One end portion of the spring is connected to the seat cushion side frame and the other end portion thereof is connected to the fourth hinge bracket.

In one example, the seat cushion side frame is composed of a seat cushion inner side frame and a seat cushion outer side frame that are fastened to each other while clamping both side end portions of the seat cushion mesh.

In one example, the seat cushion main frame is produced in a rectangular frame shape having a large hole penetrated in a center thereof in order to prevent interference with the seat cushion mesh on which a passenger load acts.

The present disclosure provides the following effects through the above configurations.

Firstly, it is possible to mount the mesh for supporting the upper body and the lower body of the passenger to the seat frame to maximize the ventilation performance and to significantly reduce the number of components compared to a conventional seat. The light weight and the cost saving benefits are thereby realized.

Secondly, it is possible to install the elastic member and the damping member to the side of the seat frame to adjust the tension of the mesh by the elastic member and to absorb the vibration of the mesh and the seat frame by the damping member. The comfortable seating feeling is thereby provided to the passenger.

Thirdly, since the size and thickness of the mesh type seat may be minimized compared to a conventional seat, it is possible to provide the slim type seat required for autonomous vehicles. Various operation trajectories for the swivel operation and the relaxation posture of the mesh type seat are thereby easily provided in the limited interior space of the autonomous vehicle.

It should be understood that the term "vehicle" or "vehicular" or other similar terms as used herein are inclusive of motor vehicles in general. Such motor vehicles may encompass passenger automobiles including sports utility vehicles (SUV), buses, trucks, and various commercial vehicles, watercraft including a variety of boats and ships, aircraft, and the like, and may encompass hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example vehicles that are both gasoline-powered and electric-powered.

The above and other features of the disclosure are discussed below.

BRIEF DESCRIPTION OF THE DRAWINGS

The above and other features of the present disclosure are now described in detail with reference to certain embodiments thereof illustrated the accompanying drawings, which are given hereinbelow by way of illustration only, and thus are not limitative of the present disclosure, and wherein.

Figure 1:
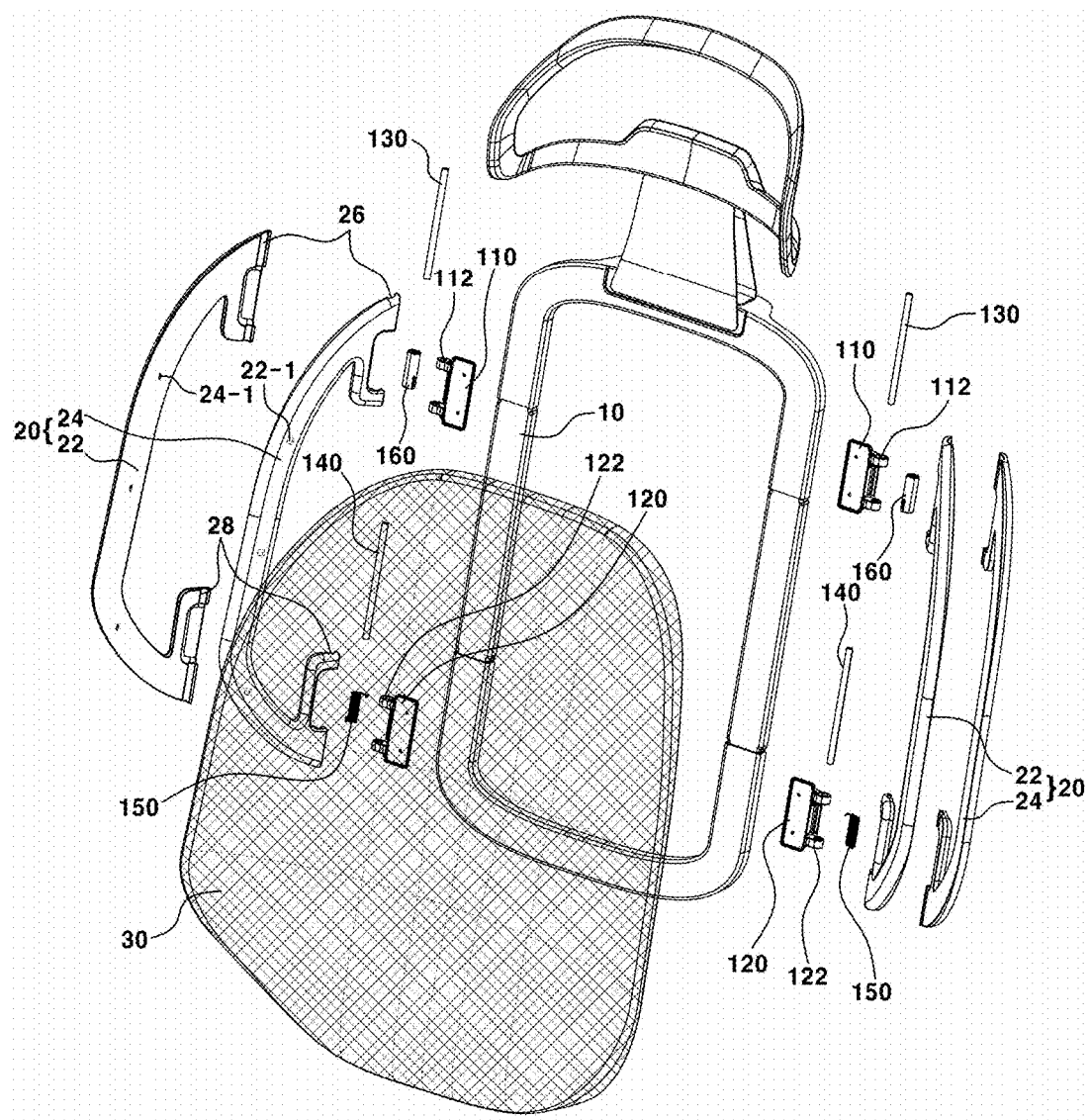
FIG. 1 is an exploded perspective diagram illustrating a seatback of a mesh type seat for a vehicle and according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined by the particular intended application and use environment.

In the figures, like reference numbers refer to the same or equivalent sections of the present disclosure throughout the several figures of the drawing.

DETAILED DESCRIPTION

Hereinafter, embodiments of the present disclosure are described in detail with reference to the accompanying drawings.

Figure 2:
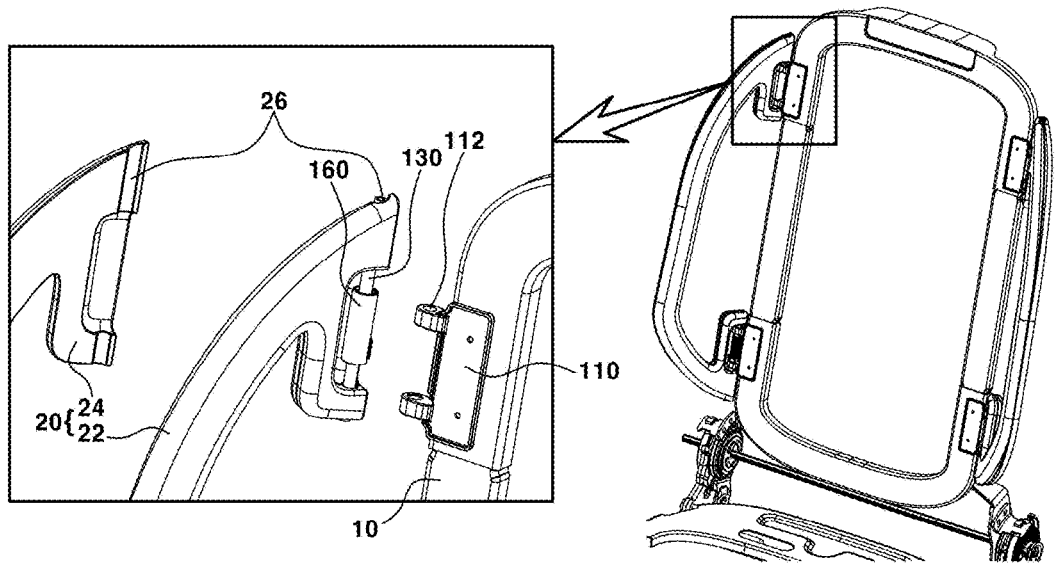
FIG. 2 is a perspective diagram illustrating an example in which a first damper is mounted to the seatback of the mesh type seat for the vehicle and according to the present disclosure.
Figure 3:
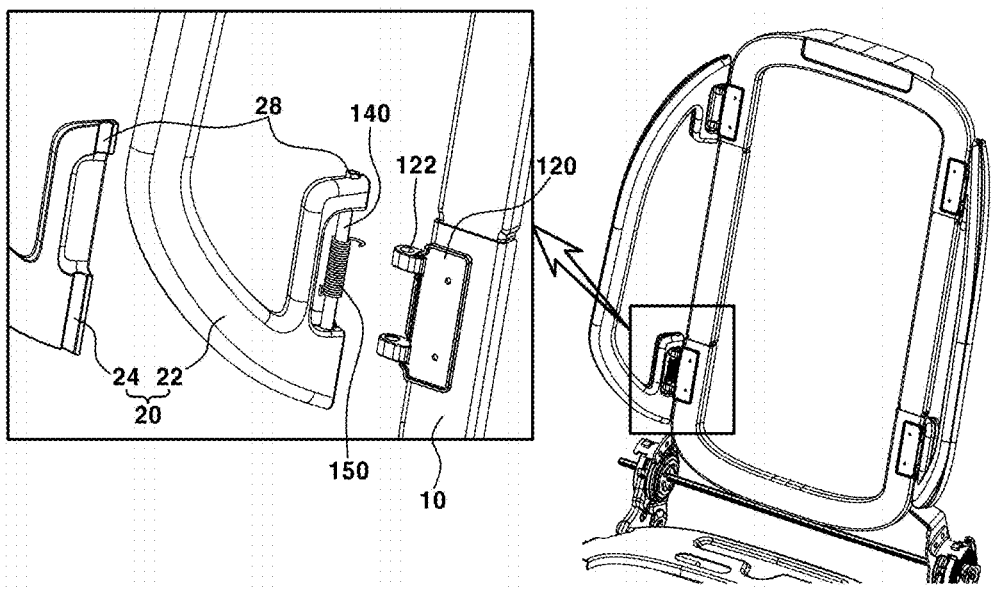
FIG. 3 is a perspective diagram illustrating an example in which a first elastic member is mounted to the seatback of the mesh type seat for the vehicle and according to the present disclosure.

FIG. 1 is an exploded perspective diagram illustrating a seatback of a mesh type seat for a vehicle and according to the present disclosure. FIGS. 2 and 3 are diagrams illustrating examples in which a first damper and a first elastic member are mounted to the seatback of the mesh type seat for the vehicle and according to the present disclosure, respectively. In each drawing, reference numeral 10 denotes a seatback main frame.

A seatback side frame 20 performs a bolster function surrounding both sides of the upper body of the passenger and is rotatably mounted to both side end portions of a seatback main frame 10 via a first hinge device.

In particular, a seatback mesh 30 is mounted to support the upper body of the passenger over the seatback main frame 10 and the seatback side frame 20.

The upper end portion and the lower end portion of the seatback mesh 30 are fixed to the upper end portion and the lower end portion of the seatback main frame 10, respectively. Both side end portions of the seatback mesh 30 are tension-adjustably fixed to the seatback side frame 20.

The seatback side frame 20 may be composed of a seatback inner side frame 22 and a seatback outer side frame 24 that are fastened to each other while clamping both side end portions of the seatback mesh 30.

For example, a pin 22-1 is formed in the seatback inner side frame 22. A pin hole 24-1 is formed in the seatback outer side frame 24 so that the pin 22-1 is inserted into and fastened to the pin hole 24-1. Therefore, the coupling between the seatback inner side frame 22 and the seatback outer side frame 24 may be made. Together with the above, both side end portions of the seatback mesh 30 may be pressed and fixed between the seatback inner side frame 22 and the seatback outer side frame 24.

Therefore, if the upper body load of the passenger acts on the seatback mesh 30, the seatback mesh 30 maintains a predetermined tension and supports the upper body of the passenger.

The seatback main frame 10 is produced in a rectangular frame shape having a large hole penetrated in the center thereof. This prevents the interference phenomenon in which the seatback mesh 30 contacts the seatback main frame 10 while being pushed backward by the upper body load of the passenger.

Further, as a fixed structure of the first hinge device, a first hinge bracket 110 is mounted to the upper end portion of the seatback main frame 10 and a second hinge bracket 120 is mounted to the lower end portion of the seatback main frame 10.

More specifically, the first hinge bracket 110 has an inside end portion mounted to the upper end portion of the seatback main frame 10 and is provided in a structure of having a first hinge pin through hole 112 vertically penetrating and formed in an outside end portion thereof. The second hinge bracket 120 also has an inside end portion mounted to the lower end portion of the seatback main frame 10 and is provided in a structure of having a second hinge pin through hole 122 vertically penetrating and formed in an outside end portion thereof.

A first hinge pin fastening hole 26 is vertically penetrating and formed in an upper end portion of the seatback side frame 20. A second hinge pin fastening hole 28 is vertically penetrating and also formed in the lower end portion of the seatback side frame 20.

Therefore, a first hinge pin 130 is inserted into and fastened to the first hinge pin fastening hole 26 and the first hinge pin through hole 112. A second hinge pin 140 is inserted into and fastened to the second hinge pin fastening hole 28 and the second hinge pin through hole 122. This results in a state where the seatback side frame 20 is rotatably mounted via the first hinge device on both side end portions of the seatback main frame 10.

According to the present disclosure, a first elastic member 150 is mounted between the seatback main frame 10 and the seatback side frame 20. A first damper 160 is mounted between the seatback side frame 20 and the first hinge device.

The first elastic member 150 is for providing an elastic restoring force outward from the seatback side frame 20. The first elastic member 150 may be adopted as a spring inserted into the outer diameter portion of the second hinge pin 140 to have one end portion connected to the seatback side frame 20 and have the other end portion connected to the second hinge bracket 120 of the first hinge device.

Further, the first damper 160 functions as absorbing the vibration of the seatback side frame 20. The first damper 160 has the outside end portion fastened to the seatback side frame 20 while being inserted into the outer diameter portion of the first hinge pin 130 in the configuration of the first hinge device.

For example, the first damper 160 may be a cylinder type damper surrounding the outer diameter portion of the first hinge pin 130. The first damper 160 may be adopted as a structure in which the friction functional fluid rubbing with the first hinge pin 130 has been sealed therein.

The passenger upper body load support and shock absorbing operation of the seatback mesh 30 are described as follows.

If the upper body load of the passenger does not act on the seatback mesh 30 mounted over the seatback main frame 10 and the seatback side frame 20 (a state where the passenger is not yet seated), the first elastic member 150 maximally exerts the elastic restoring force pushing the seatback side frame 20 outward.

Figure 6:
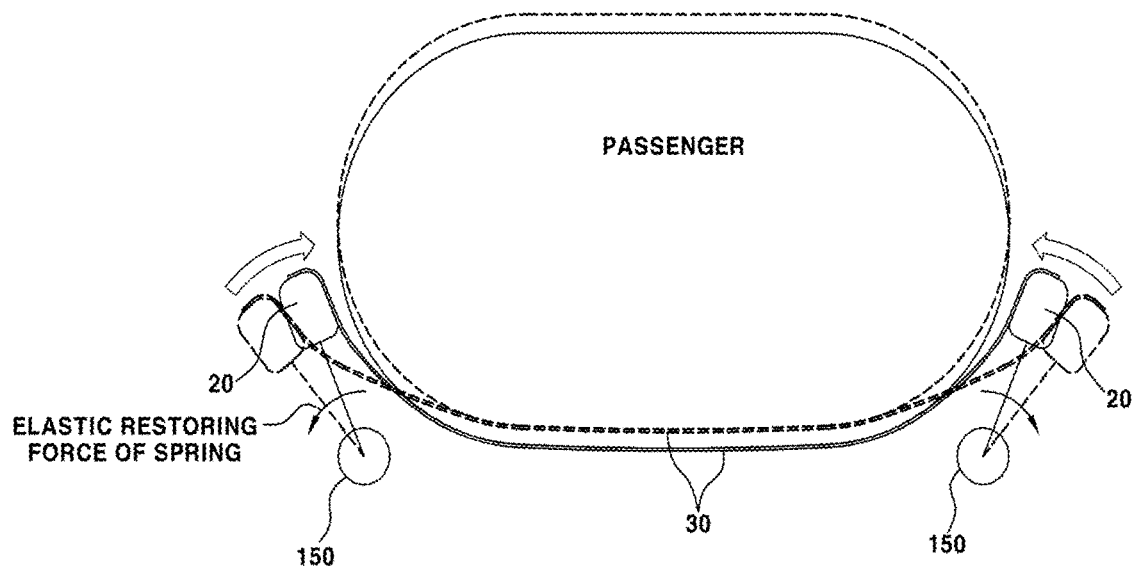
FIG. 6 is a conceptual diagram illustrating a state where a passenger has been seated on the mesh type seat for the vehicle and according to the present disclosure.

At the same time, both side end portions of the seatback mesh 30 fixed to the seatback side frame 20 are pulled to become in a state where the seatback mesh 30 maintains a predetermined tension and is arranged at the foremost position (see the double dotted line in FIG. 6).

In this state, if the upper body load of the passenger acts on the seatback mesh 30 (a state where the passenger is now seated), the seatback mesh 30 becomes in a state that is slightly pushed backward and is arranged while the seatback side frame 20 angularly rotates inward (see the double solid line in FIG. 6).

At the same time, the seatback mesh 30 supports the upper body load of the passenger while continuously maintaining a predetermined tension by the elastic restoring force of the first elastic member 150.

Figure 7:
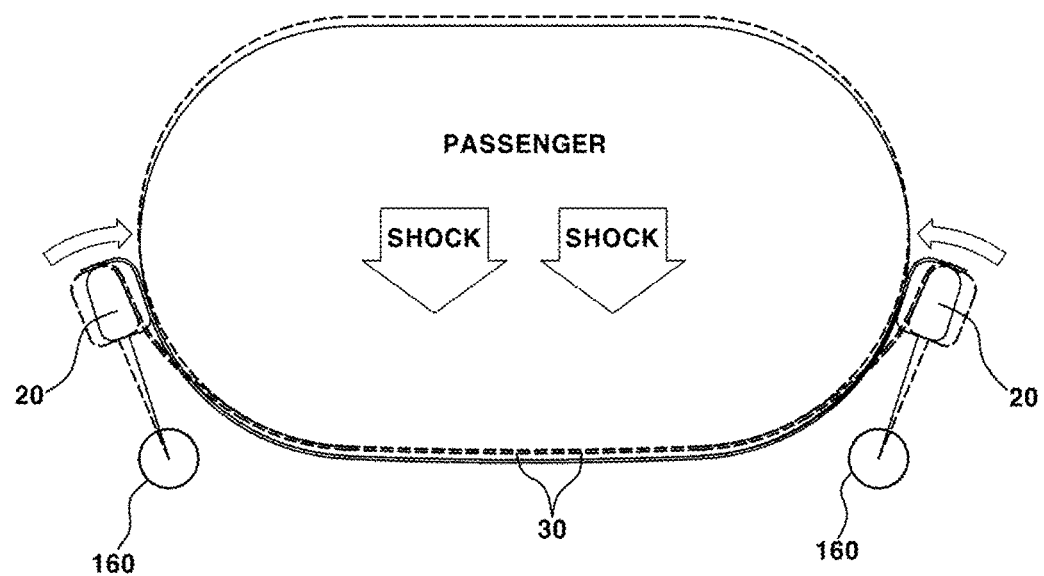
FIG. 7 is a conceptual diagram illustrating an operation of absorbing the running shock in the state where the passenger has been seated on the mesh type seat for the vehicle and according to the present disclosure.

At this time, if the upper body load of the passenger acts momentarily on the seatback mesh 30 due to vibration and shock resulting from the driving or running of the vehicle, the seatback mesh 30 becomes in a state that is further pushed backward and is arranged while the seatback side frame 20 angularly rotates further inward (for example, which is pushed from the double dotted line to the double solid line in FIG. 7). Nonetheless, the seatback mesh 30 supports the upper body load of the passenger while continuously maintaining a predetermined tension by the elastic restoring force of the first elastic member 150.

Furthermore, the upper body load of the passenger acts momentarily on the seatback mesh 30 due to the vibration and the shock while the vehicle is driving or running, and at the same time, is delivered to the seatback side frame 20 to which both side end portions of the seatback mesh 30 have been connected. As a result, the seatback mesh 30 and the seatback side frame 20 may vibrate and shake.

However, since the first damper 160 may serve to buffer the shock when the upper body load of the passenger is momentarily delivered to the seatback side frame 20 through the seatback mesh 30 due to the vibration and the shock resulting from driving or running the vehicle, it is possible to absorb the vibration of the seatback mesh 30 and the seatback side frame 20, thereby providing a comfortable seating feeling to the passenger.

Figure 4:
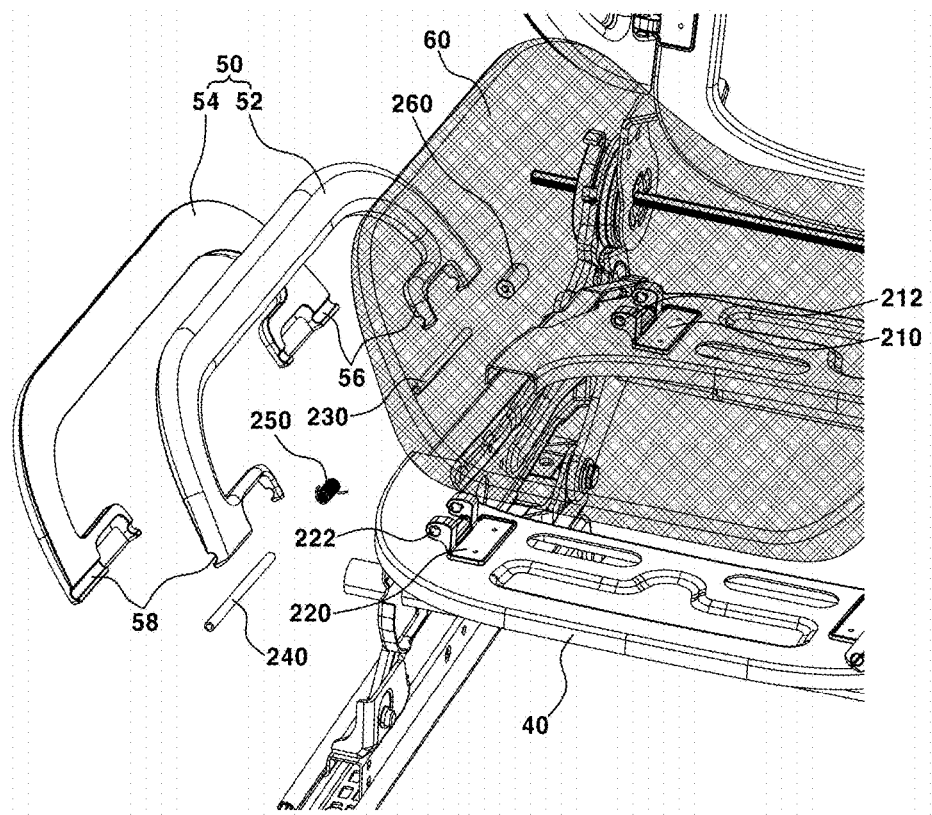
FIG. 4 is an exploded perspective diagram illustrating a seat cushion of the mesh type seat for the vehicle and according to the present disclosure.
Figure 5:
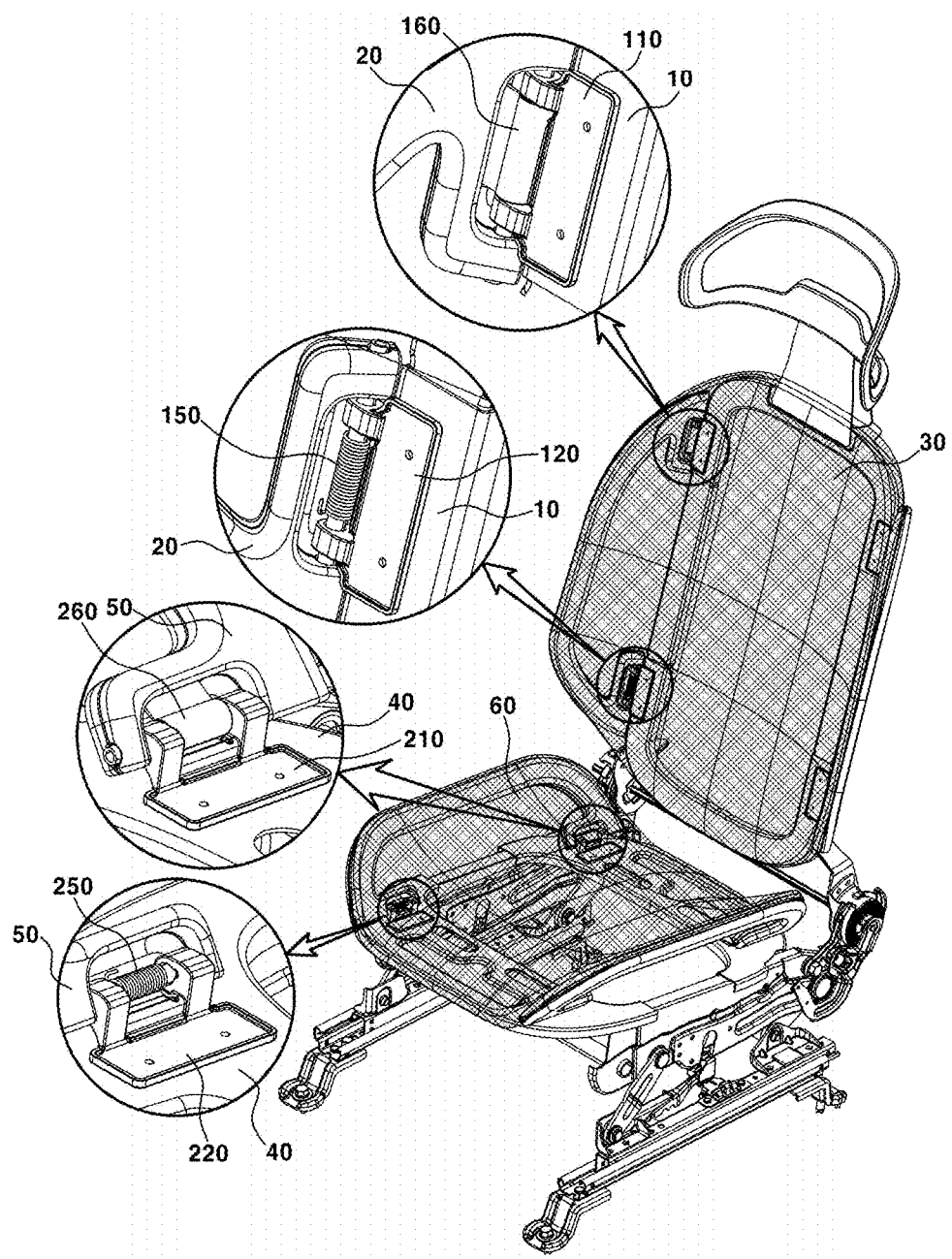
FIG. 5 is an assembled perspective diagram illustrating the mesh type seat for the vehicle and according to the present disclosure.

FIG. 4 is an exploded perspective diagram illustrating a seat cushion of the mesh type seat for the vehicle and according to the present disclosure. FIG. 5 is an assembled perspective diagram illustrating the mesh type seat for the vehicle and according to the present disclosure. In each drawing, reference numeral 40 denotes a seat cushion main frame.

A seat cushion side frame 50 performs a bolster function surrounding both sides of the lower body of the passenger and is rotatably mounted to both side end portions of a seat cushion main frame 40 via a second hinge device.

In particular, a seat cushion mesh 60 is mounted to support the lower body of the passenger over the seat cushion main frame 40 and the seat cushion side frame 50.

The front end portion and the rear end portion of the seat cushion mesh 60 are fixed to the front end portion and the rear end portion of the seat cushion main frame 40, respectively. Both side end portions of the seatback mesh 30 are tension-adjustably fixed to the seat cushion side frame 50.

The seat cushion side frame 50 may be composed of a seat cushion inner side frame 52 and a seat cushion outer side frame 54 that are fastened to each other while clamping both side end portions of the seat cushion mesh 60.

Therefore, if the lower body load of the passenger acts on the seat cushion mesh 60, the seat cushion mesh 60 maintains a predetermined tension and supports the upper body of the passenger.

The seat cushion main frame 40 is produced in a rectangular frame shape having a large hole penetrated in a center thereof. This prevents the interference phenomenon in which the seat cushion mesh 60 contacts the seat cushion main frame 40 while being pushed downward by the lower body load of the passenger.

Meanwhile, as a fixed structure of the second hinge device, a third hinge bracket 210 is mounted to the rear end portion of the seat cushion main frame 40 and a fourth hinge bracket 220 is mounted to the front end portion of the seat cushion main frame 40.

More specifically, the third hinge bracket 210 is provided in a structure of having a third hinge pin through hole 212 formed in the outside end portion thereof to be mounted to the rear end portion of the seat cushion main frame 40. The fourth hinge bracket 220 is provided in a structure of having a fourth hinge pin through hole 222 formed in the outside end portion thereof to be mounted to the front end portion of the seat cushion main frame 40.

Further, the second hinge device is configured to include a third hinge pin 230 and a fourth hinge pin 240. The third hinge pin 230 is inserted into and fastened to a third hinge pin fastening hole 56 formed in the rear end portion of the seat cushion side frame 50 and the third hinge pin through hole 212 of the third hinge bracket 210. The fourth hinge pin 240 is inserted into and fastened to a fourth hinge pin fastening hole 58 formed in the front end portion of the seat cushion side frame 50 and the fourth hinge pin through hole 222 of the fourth hinge bracket 220.

According to the present disclosure, a second elastic member 250 is mounted between the seat cushion main frame 40 and the seat cushion side frame 50. A second damper 260 is mounted between the seat cushion side frame 50 and the second hinge device.

The second elastic member 250 is for providing an elastic restoring force outward from the seat cushion side frame 50. The second elastic member 250 may be adopted as a spring as in the first elastic member 150.

Further, the second damper 260 functions as absorbing the vibration of the seat cushion side frame 50. The second damper 260 has an outside end portion fastened to the seat cushion side frame 50 as in the mounted structure of the first damper 160.

The passenger lower body load support and shock absorbing operation of the seat cushion mesh 60 are described as follows.

If the lower body load of the passenger does not act on the seat cushion mesh 60 mounted over the seat cushion main frame 40 and the seat cushion side frame 50 (a state where the passenger is not yet seated), the second elastic member 250 maximally exerts an elastic restoring force that pushes the seatback side frame 20 outward.

At the same time, the seat cushion mesh 60 becomes in a state that maintains a predetermined tension and is arranged at the foremost position while both side end portions of the seat cushion mesh 60 fixed to the seat cushion side frame 50 is pulled.

In this state, if the lower body load of the passenger acts on the seat cushion mesh 60 (a state where the passenger is now seated), the seat cushion mesh 60 becomes in a state that is pushed downward and arranged while the seat cushion side frame 50 angularly rotates inward. At the same time, the seat cushion mesh 60 supports the lower body load of the passenger while continuously maintaining a predetermined tension by the elastic restoring force of the second elastic member 250.

At this time, if the lower body load of the passenger acts momentarily on the seat cushion mesh 60 due to the vibration and the shock that results during driving or running of the vehicle, the seat cushion mesh 60 becomes in a state that is further pushed downward and arranged while the seat cushion side frame 50 angularly rotates further inward. Nonetheless, the seat cushion mesh 60 supports the upper body load of the passenger while continuously maintaining a predetermined tension by the elastic restoring force of the second elastic member 250.

Furthermore, the lower body load of the passenger acts momentarily on the seat cushion mesh 60 due to the vibration and the shock from driving or running of the vehicle, and at the same time, is delivered to the seat cushion side frame 50 to which both side end portions of the seat cushion mesh 60 have been connected. As a result, the seat cushion mesh 60 and the seat cushion side frame 50 may vibrate and shake.

However, since the second damper 260 may serve to buffer the shock when the lower body load of the passenger is momentarily delivered to the seat cushion side frame 50 through the seat cushion mesh 60 due to the vibration and the shock resulting from driving or running of the vehicle, it is possible to absorb the vibration of the seat cushion mesh 60 and the seat cushion side frame 50, thereby providing a comfortable seating feeling to the passenger.

Although the embodiments of the present disclosure have been described in detail, the scope of the present disclosure is not limited thereto. Various modifications and improvements of those having ordinary skill in the art using the basic concepts of the present disclosure defined in the following claims are also included in the scope of the present disclosure.

What is claimed is:

1. A mesh type seat for a vehicle, the mesh type seat comprising:
    a seatback main frame having side end portions;
    a seatback side frame rotatably mounted to both of the side end portions of the seatback main frame via a first hinge device;
    a first elastic member connected between the seatback main frame and the seatback side frame to provide an elastic restoring force outward from the seatback side frame;

a first damper connected between the seatback side frame and the first hinge device to absorb vibration of the seatback side frame; and a seatback mesh having an upper end portion and a lower end portion fixed to the seatback main frame and having side end portions, both of which are fixed to the seatback side frame, wherein the seatback side frame includes a seatback inner side frame and a seatback outer side frame that are fastened to each other while clamping both side end portions of the seatback mesh.

2. The mesh type seat of claim 1, wherein the first hinge device comprises:

a first hinge bracket provided having a first hinge pin through hole formed in an outside end portion thereof to be mounted to an upper end portion of the seatback main frame;

a second hinge bracket provided having a second hinge pin through hole formed in an outside end portion thereof to be mounted to a lower end portion of the seatback main frame;

a first hinge pin inserted into and fastened to a first hinge pin fastening hole formed in the upper end portion of the seatback side frame and the first hinge pin through hole of the first hinge bracket; and a second hinge pin inserted into and fastened to a second hinge pin fastening hole formed in the lower end portion of the seatback side frame and the second hinge pin through hole of the second hinge bracket.

3. The mesh type seat of claim 2, wherein an outside end portion of the first damper is fastened to the seatback side frame while the first damper is inserted into an outer diameter portion of the first hinge pin.

4. The mesh type seat of claim 2, wherein a spring is inserted into an outer diameter portion of the second hinge pin as a first elastic member for providing an elastic restoring force outward from the seatback side frame, and wherein one end portion of the spring is connected to the seatback side frame and the other end portion thereof is connected to the second hinge bracket.

5. The mesh type seat of claim 1, wherein the seatback main frame is produced in a rectangular frame shape having a large hole in a center thereof to prevent interference with the seatback mesh on which a passenger load acts.

6. The mesh type seat of claim 1, further comprising:

a seat cushion main frame having side end portions;

a seat cushion side frame rotatably mounted to both of the side end portions of the seat cushion main frame via a second hinge device;

a second elastic member connected between the seat cushion main frame and the seat cushion side frame to provide an elastic restoring force outward from the seat cushion side frame;

a second damper connected between the seat cushion side frame and the second hinge device to absorb vibration of the seat cushion side frame; and a seat cushion mesh having a front end portion and a rear end portion fixed to the seat cushion main frame, and having side end portions, both of which are fixed to the seat cushion side frame.

7. The mesh type seat of claim 6, wherein the second hinge device comprises:

a third hinge bracket provided having a third hinge pin through hole formed in an outside end portion thereof to be mounted to a rear end portion of the seat cushion main frame;

a fourth hinge bracket provided having a fourth hinge pin through hole formed in an outside end portion thereof to be mounted to a front end portion of the seat cushion main frame;

a third hinge pin inserted into and fastened to a third hinge pin fastening hole formed in the rear end portion of the seat cushion side frame and the third hinge pin through hole of the third hinge bracket; and a fourth hinge pin inserted into and fastened to a fourth hinge pin fastening hole formed in the front end portion of the seat cushion side frame and the fourth hinge pin through hole of the fourth hinge bracket.

8. The mesh type seat of claim 7, wherein an outside end portion of the second damper is fastened to the seat cushion side frame while the second damper is inserted into an outer diameter portion of the third hinge pin.

9. The mesh type seat of claim 7, wherein a spring is inserted into an outer diameter portion of the fourth hinge pin as a second elastic member for providing an elastic restoring force outward from the seat cushion side frame, and wherein one end portion of the spring is connected to the seat cushion side frame and the other end portion thereof is connected to the fourth hinge bracket.

10. The mesh type seat of claim 6, wherein the seat cushion side frame comprises a seat cushion inner side frame and a seat cushion outer side frame that are fastened to each other while clamping both side end portions of the seat cushion mesh.

11. The mesh type seat of claim 6, wherein the seat cushion main frame is produced in a rectangular frame shape having a large hole in a center thereof to prevent interference with the seat cushion mesh on which a passenger load acts.

* * * * *